Jan. 12, 1965   R. P. HUMPHREY   3,165,030
ROTARY FLUID PRESSURE PUMP AND MOTOR
Filed March 27, 1963   2 Sheets-Sheet 1
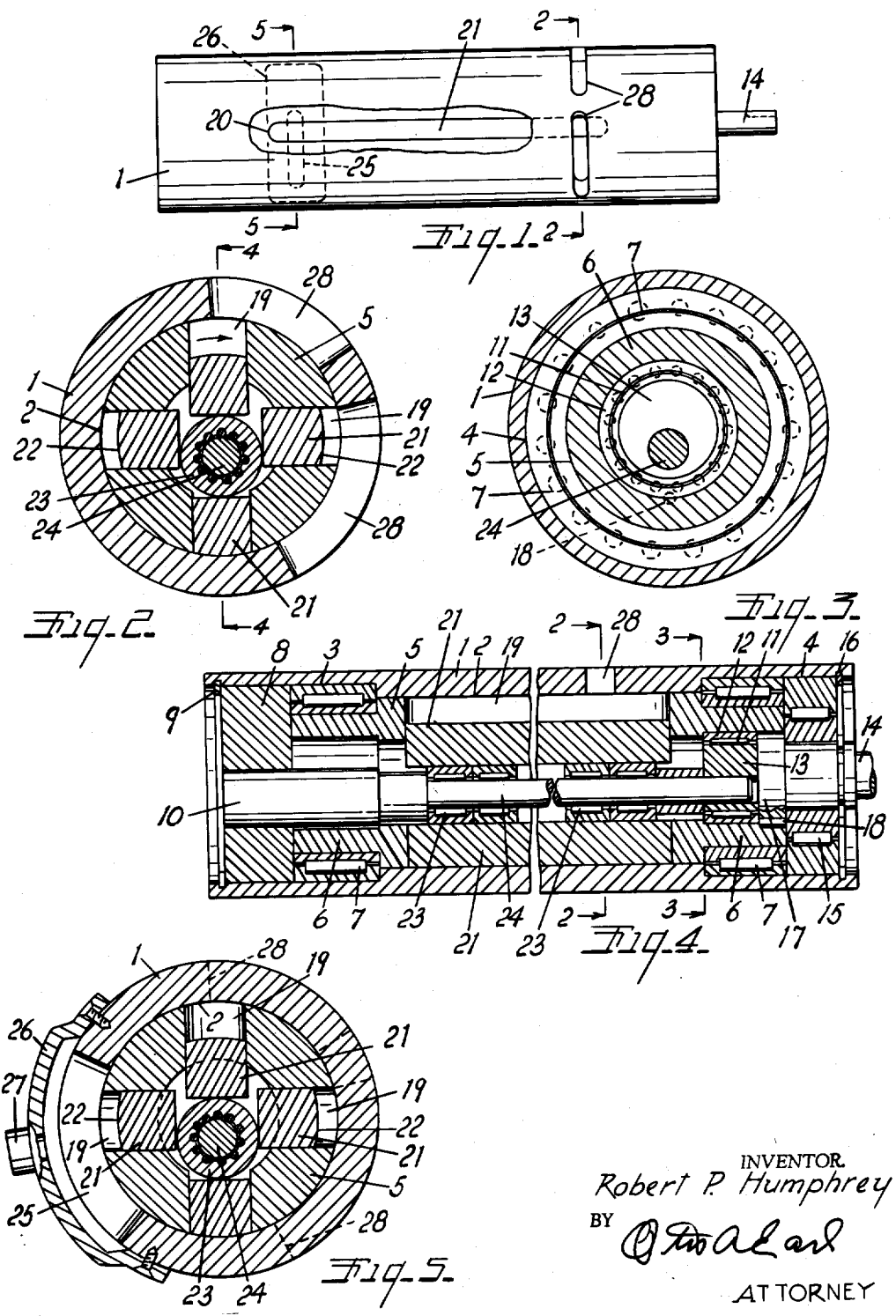
INVENTOR.
Robert P. Humphrey
BY
ATTORNEY

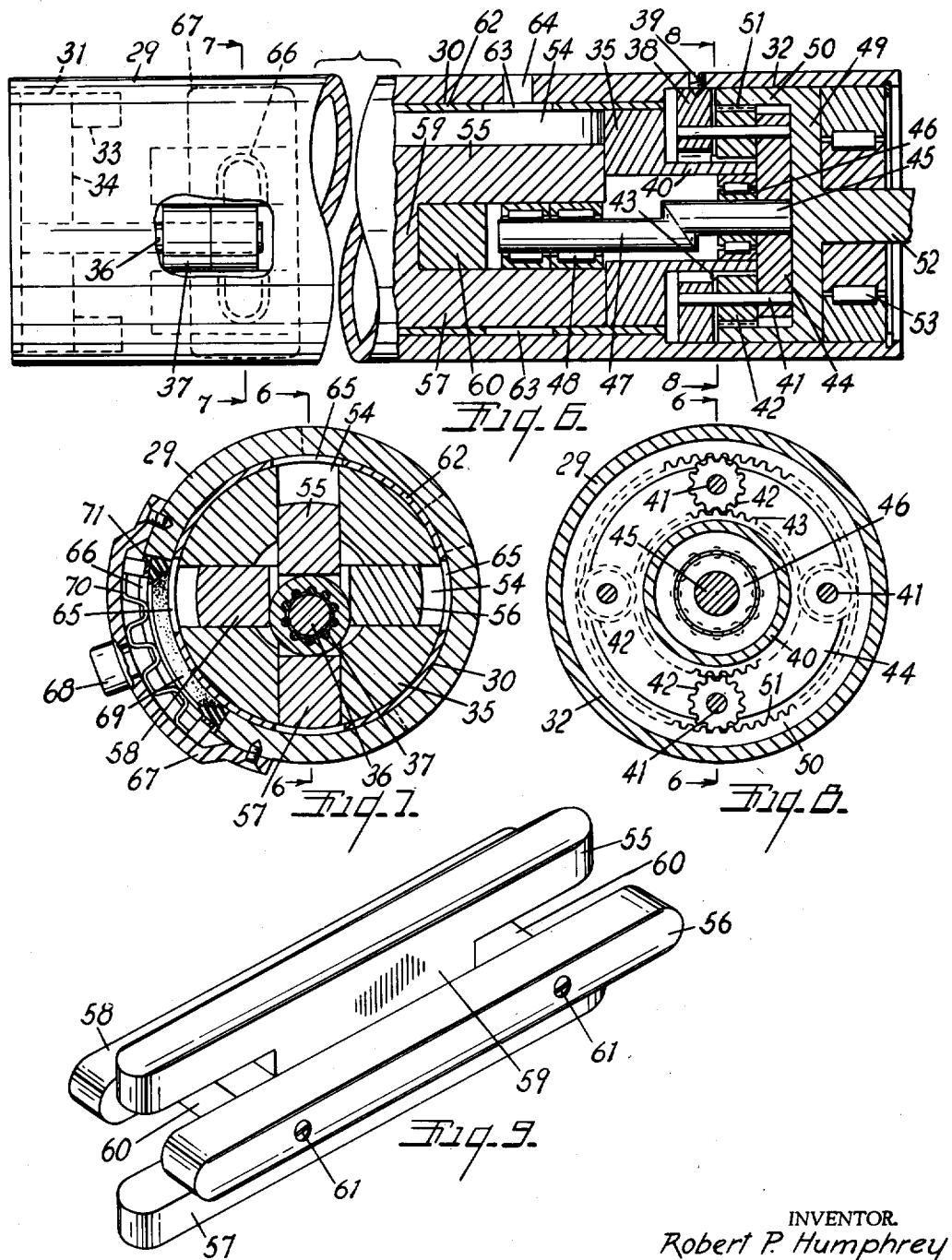

United States Patent Office 3,165,030
Patented Jan. 12, 1965

---

3,165,030
ROTARY FLUID PRESSURE PUMP AND MOTOR
Robert P. Humphrey, Kalamazoo, Mich., assignor to Humphrey Products Division General Gas Light Company, Kalamazoo, Mich.
Filed Mar. 27, 1963, Ser. No. 268,349
20 Claims. (Cl. 91—202)

This invention relates to improvements in rotary fluid pressure pump and motor. The principal objects of this invention are:

First, to provide an air pump and motor having a tubular cylindrical body with a tubular cylindrical rotor rotatably supported in said body concentrically thereof and characterized by the rotor and body being in closely fitting radially supported relation to each other, said rotor being of substantial radial thickness in its wall, angularly spaced axially extending slots formed in said rotor and opening radially to the interior of said rotor and terminating short of the ends of said rotor, a shaft connected concentrically to said rotor and extending outwardly of said body, elongated rigid pressure elements radially reciprocably and substantially sealingly slidably fitted in said slots, abutment reaction pin means supported at one end from said body and at the other end from the other end of said body, said pin means having bearing surfaces opposed to the ends of said pressure elements that are eccentric to said rotor and in substantially tangential but relatively movable clearing relation to the interior of said rotor, said pressure elements being approximately equal in radial thickness to the radial depth of said slots at their transverse centers and having surfaces opposed to said bearing surfaces, a first fluid passage formed in said body and opening to said slots, said first passage extending angularly around said body from a point adjacent the maximum projection of said pressure elements by said eccentric bearing surfaces and extending in angularly advancing direction corresponding to relative rotation of said shaft to a point short of maximum retraction of said pressure elements, and a second fluid passage formed in said body and opening to said slots and starting from a point spaced angularly from the end of said first slot and adjacent the point of maximum retraction of said pressure elements to a point short of the maximum extension of said pressure elements.

Second, to provide a rotary fluid pressure device usable as a pump or motor in which maximum fluid displacement space is provided in a body of given diameter and with a reaction force transmitting member of a given strength and size.

Third, to provide a pump and motor in which radially reciprocable and rotatable pressure elements are centrifugally balanced permitting extremely high speed operation of the device.

Fourth, to provide a pump and motor with a slotted rotor rotating concentrically in a body with elongated pressure elements reciprocating in the slots, in which a thin sleeve fitted over the rotor and the slots therein closes the outer ends of the slots except at the inlet and outlet ports to eliminate the necessity of extremely close sealing tolerances in the size of the rotor and its enclosing body.

Fifth, to provide a pump and motor with an axially slotted rotor rotating in a cylindrical body and elongated pressure elements in the slots reciprocated by a central eccentric reaction abutment, in which the rotor is connected to an externally extending shaft by a speed reducing planetary gearing enclosed within the tubular body.

Sixth, to provide a pump and motor having a cylindrical body with a tubular cylindrical rotor rotatable therein and having slots through its side walls forming expansible pressure chambers and surrounded by a thin rotating sleeve, the body being provided with a segmental inlet port and surrounding pressure supply chamber with an annular flexible seal in the port urged into sealing engagement with the rotating surface of the rotating sleeve to prevent escape of pressure through the rotational clearance between the body and the sleeve.

Other objects and advantages of the invention will be apparent from a consideration of the following description and claims. The drawings, of which there are two sheets, illustrate two highly practical forms of the invention, the first particularly adapted as a motor, the second adapted as either a fluid pump or a motor.

FIG. 1 is a fragmentary side elevational view of an air motor, partially broken away to illustrate internal parts.

FIG. 2 is a transverse cross sectional view taken through the exhaust port along the line 2—2 in FIGS. 1 and 4.

FIG. 3 is a transverse cross sectional view taken at the end bearings along the plane of the line 3—3 in FIG. 4.

FIG. 4 is a fragmentary longitudinal cross sectional view taken along the plane of the line 4—4 in FIG. 2.

FIG. 5 is a transverse cross sectional view through the inlet port taken along the plane of the line 5—5 in FIG. 1.

FIG. 6 is a fragmentary side elevational view of a modified form of the invention adapted for use as a pump or a motor, the view being broken away in longitudinal cross section along the plane of the line 6—6 in FIGS. 7 and 8.

FIG. 7 is a transverse cross sectional view through the inlet or suction connection taken along the plane of the line 7—7 in FIG. 6.

FIG. 8 is a transverse cross sectional view showing the planetary gear connection between the rotor and the external shaft, the view being taken along the plane of the line 8—8 in FIG. 6.

FIG. 9 is a perspective view of the pressure element assembly appearing in FIGS. 6 and 7.

The motor shown in FIGS. 1–5 is enclosed in a tubular body 1 having a cylindrical inner bore 2 with enlarged counter bores 3 and 4 at its ends. The cylindrical outer shape of the body is desirable but not essential. Rotatably and sealingly fitted in the inner bore 2 is a tubular cylindrical rotor 5 having externally reduced end portions 6. Bearings 7 fitted around the reduced end portions and within the counter bores 3 and 4 assist in rotatably supporting the rotor. A fixed end member 8 secured in the counter bore 3 by the snap ring 9 supports one end of an abutment or reaction pin or shaft 10 that extends axially and eccentrically in fixed position through the rotor 5. A bearing 11 having an outer race 12 rotatable concentrically with the inside of the rotor has a central body 13 fixedly supporting the other end of the pin or shaft 10 in parallel eccentric position in the rotor. A driven output shaft 14 is rotatably supported in the counter-bore 4 by a bearing 15 held in place by the snap ring 16. A shoulder or flange 17 on the inner end of the shaft is non-rotatably and drivingly connected to the end of the rotor by the interlock pin 18.

The center portion of the rotor 5 defines a plurality of axially extending slots 19, four slots in diametrically opposed sides being illustrated in the example shown. These slots extend completely through the wall of the rotor which is of substantial thickness. The sides of the slots are parallel to radial planes of the rotor passed through the centers of the slots and the ends of the slots are arcuately rounded as at 20 (see FIG. 1). The arcuate rounding is not essential but is easily machined. Radially reciprocably mounted in the slots are four bar-like elongated rigid pressure elements 21. The pressure elements are sized to slidably and substantially sealing fit the slots. Desirably the outer faces of the pressure elements are transversely curved to the same radius as the outside or the rotor as at 22 and the inner faces of the pressure elements are flat chords at least at their ends where they are contacted by bearings 23. The bearings 23 are rotatable on the central reduced portion 24 of the reaction or abutment pin 10 so their bearing surfaces are eccentric to the inside of the rotor.

A segmental arcuate inlet or pressure port 25 is formed through the outer body 1 where it will register with each successive slot 19 and the pressure element 21 therein just ahead of or after the slot passes the point of maximum eccentricity of the pin 10 and the point of maximum radial extension of the pressure elements. In the example illustrated, this is at the bottom of the pin and body in FIGS. 1 to 5. The slot extends somewhat less than 180° around the body so that if air presure is directed through the slot to the outer face of each successive pressure element the element is forced inwardly in its slot and against the radially receding side of the surface of the eccentric bearings 23. The force applied to the reaction pin which is eccentric to both the rotor and the body has a reaction component or vector directed angularly around the body which in turn causes the rotor to rotate carrying the pressure elements with it. The inlet slot terminates short of the point of minimum eccentricity of the bearings so there is a short period of angular rotation of the rotor and pressure elements in which power may be supplied by expansion of the compressed air trapped in each slot under the unslotted portion of the body. An inlet housing 26 secured to the outside of the body over the inlet port directs air pressure from the supply duct 27 to all portions of the port.

As soon as the rotor and each successive pressure element rotates in the clockwise direction illustrated to the point of minimum eccentricity of the bearings 23 the slots 19 are vented to the outside of the body through an exhaust port 28. The port 28 extends, in two parts, to substantially the point of maximum eccentricity of the bearings 23 so there will be no back-pressure or resistance to radial extension of the pressure elements 21 as they are advanced over the radially increasing side of the bearings. The width of the slots and the pressure elements 21 causes the slots to register with the exhaust port short of the plane of maximum eccentricity so the exhaust port stops short of the bottom of the body as illustrated.

The modified body 29 in FIGS. 6 to 8 has a central internal cylindrical surface 30 and counter-bored ends 31 and 32. The counter-bore 31 encloses a bearing 33 and end member 34 similar to the bearing 7 and end member 8 in FIG. 4. The bearing 33 rotatably supports the radially reduced end of a tubular rotor 35 as in FIG. 1 but the end member 34 supports a short abutment pin 36 eccentrically within one end of the rotor. Bearings 37 on the pin engage one end of the pressure elements to be described.

At the other end of the body, a carrier ring 38 is fixedly held in the counter-bore 32 by a lock-screw 39 and surrounding the reduced end 40 of the rotor. The carrier ring has pins 41 rotatably supporting planet gears 42 on the fixed axes of the pins. The planet gears mesh on their inner sides with a sun gear 43 formed on or secured to the reduced end 40 of the rotor. Outwardly from the planet gears 42 and the end of the rotor, the pins 41 fixedly support an anchor disc 44. A stub shaft 45 projecting concentrically inwardly from the anchor disc and stabilized by the bearing 46 in the end of the rotor has an eccentric off-set 47 with bearings 48 on its inner end which engage and support the inner faces of the pressure elements along the same axis as the axis of pin 36.

A circular drive plate 49 mounted at the outer side of the anchor disc has a cylindrical flange 50 extending inwardly across the anchor plate with an internal ring gear 51 at its inner end meshing with the radially outer sides of the planet gears 42. The shaft 52, which may be either an input or output shaft, is connected to the drive plate and projects outwardly of the body through the bearing 53. Rotation of the rotor 35 and sun gear 43 is thus in the same proportion to the speed of the shaft and the ring gear 51 as the proportion of the diameters of the ring gear and sun gear with the shaft operating at the slower speed.

The rotor 35 defines two pairs of diametrically opposed slots 54 which are of the same general shape as the slots 19 in the first air motor form of the invention. The slots slidably reciprocably receive elongated rigid pressure elements 55, 56, 57 and 58. As appears most clearly in perspective view FIG. 9, the pressure elements 55 and 57 are integrally connected by a cross piece 59 to form an H-shaped element. The pressure element 58 has spaced cross bars 60 connected thereto that project transversely of the ends of the cross piece 59, and are detachably secured to the fourth pressure element 56 as by the screws 61. The opposed pressure elements are thus connected together so that when one is forced positively outwardly by engagement with the eccentric bearings 37 and 48 the other is positively drawn in to act as a suction element when the device is driven from the shaft 52 and used as a pump. The cross connection of opposed pressure elements also balances or counteracts centrifugal forces that would tend to hold the pressure elements at the outer sides of the slots, even against driving air pressure when the unit is used as an air motor at high speeds. The unit can thus be driven at extremely high speed by the application of sufficient pressure.

With the parts as shown, and used as a motor, air pressure from connection 68 acts through passage or slot 66 and registering port 65 to press one pressure element against the eccentric abutment bearings 37, 48. The eccentric location of the bearings relative to the rotor cause the rotor to rotate. The seal 71 prevents leakage of air pressure along the surface of the sleeve. After the element 58 and chamber 54 and port 65 pass the inlet, expanding air continues to drive the rotor until the pressure element is fully retracted and port 63 at the other end of the rotor registers with slot 64 as an exhaust port. The succeeding chamber and pressure element continue to drive the rotor as the increasing eccentricity of the abutments drives the first pressure element out expelling spent air.

A feature of the modified pump-motor in FIGS. 6–9 is that a relatively thin metallic sleeve 62 is press or shrink fitted around the center portion of the rotor 35 to cover the outer sides of the slots 54 and to rotate with the rotor. Ports 63 in the sleeve afford communication between the interior of the slots 54 and exhaust port 64 in the body which may be the same as the port 28 in FIGS. 1–5. When the unit in FIGS. 6–9 is used as a pump a suitable collecting or receiving manifold (not illustrated) may be secured over the exhaust port 64.

Inlet ports 65 formed in the sleeve are rotated successively into registry with an arcuate inlet passage 66 in the body wall. The passage 66 is surrounded by an inlet manifold or housing 67 having a pressure supply or suction connection 68. An annular deformable seal 69 is positioned within the passage 66 and urged into sealing engagement with the rotating sleeve 62 by a zig-zag spring 70. This inner edge of the seal is undercut as at 71 so that when the unit is used as a motor, air pressure on the back of the seal tends to deflect the inner edge of the seal more firmly into sealing engagement with the rotor surface. Since the sleeve closes the outer sides of the slots 54 except at the ports 63 and 65 and since the seal 69 seals around the inlet passage 66 to the outer surface of the sleeve, it is not necessary to maintain such close sealing tolerances between the inside bore 30 of the body 29 and the sleeve. A reasonable rotating clearance is all that is necessary. When a slot 64 and the closing portion of the sleeve is under pressure, the surrounding portion of the bore 30 supports the sleeve so that the sleeve does not have to resist the entire pressure load and may be of relatively thin cross section. Thus the addition of the sleeve does not add materially, if at all, to the over all diameter of the body 29.

The angular positions and extent of the inlet passage 69 and exhaust port 64 is essentially the same as the passage 25 and port 28 in FIGS. 1–5. In both forms of the pump and motor a maximum displacement volume and therefore maximum power or capacity is provided within any given diameter of body because the eccentric abutment or reaction element that causes reciprocation of the pressure elements is stationary and the pressure chambers and pressure elements rotate around it. It is not necessary to provide diametrical space for rotation of an orbiting eccentric to provide an equal "throw" or reciprocation of the pressure elements. Either form of the pump-motor can further be made in different lengths to provide different capacities within the same outer diameter.

The form of the device in FIGS. 6–9 when used as a motor has the advantage of providing a speed reduction torque increase between the air operated rotor and the output shaft.

What is claimed as new is:

1. An air motor comprising,
  an elongated cylindrical body,
  a cylindrical rotor rotatably and sealingly mounted within said body with the ends of the rotor spaced inwardly from the ends of the body,
  anti-friction bearings engaged between the ends of said rotor and the interior of said body and restraining said rotor against axial movement,
  a third bearing positioned concentrically in one end of said body and supporting an output shaft drivingly keyed to said rotor,
  a bearing positioned concentrically within said rotor axially inwardly of said output shaft and supporting a reaction pin projecting eccentrically through said rotor,
  a fixed support member retained in the opposite end of said body from said output shaft and fixedly supporting the opposite end of said reaction pin,
  said rotor defining diametrically opposed pairs of longitudinal slots with arcuately rounded ends defining pressure chambers that rotate within said body with said output shaft,
  elongated pressure elements radially reciprocably and sealingly mounted in said slots and having outer surfaces curved to the same radius as said rotor,
  bearing members rotatably mounted on said reaction pin and bearing against the inner faces of said pressure elements in eccentric relation to said body and rotor whereby rotation of the rotor will force the pressure elements to reciprocate in said slots and vice versa,
  and means forming a pressure supply duct around a portion of said body,
  said body having an inlet opening formed therein and opening between the surfaces of said rotor and said pressure elements and said duct from a position advanced from the point of maximum eccentricity of said pin to a point advanced to less than 180° from said point,
  said body further having an exhaust port formed therethrough in angularly advanced relation to said inlet opening and extending angularly to adjacent said point of maximum eccentricity of said pin.

2. An air motor comprising,
  an elongated cylindrical body,
  a cylindrical rotor rotatably and sealingly mounted within said body with the ends of the rotor spaced inwardly from the ends of the body,
  anti-friction bearings engaged between the ends of said rotor and interior of said body and restraining said rotor against axial movement,
  a third bearing positioned concentrically in one end of said body and supporting an output shaft drivingly keyed to said rotor,
  a bearing positioned concentrically within said rotor axially inwardly of said output shaft and supporting a reaction pin projecting eccentrically through said rotor,
  a fixed support member retained in the opposite end of said body from said output shaft and fixedly supporting the opposite end of said reaction pin,
  said rotor defining diametrically opposed longitudinal slots with arcuately rounded ends defining pressure chambers that rotate within said body with said output shaft,
  elongated pressure elements radially reciprocably and sealingly mounted in said slots and having outer surfaces curved to the same radius as said rotor,
  bearing members rotatably mounted on said reaction pin and bearing against the inner faces of said pressure elements in eccentric relation to said body and rotor whereby rotation of the rotor will force the pressure elements to reciprocate in said slots and vice versa,
  and means forming a pressure supply duct around a portion of said body,
  said body having an inlet opening formed therethrough from said duct to the surfaces of said rotor and said pressure elements and extending from a position advanced from the point of maximum eccentricity of said pin to a position less than 180° displaced from said point,
  said body further defining an exhaust port angularly advanced from said inlet opening and extending to a point opening to the point of maximum radial extension of said pressure elements by said pin.

3. An air motor comprising,
  an elongated cylindrical body,
  a cylindrical rotor rotatably and sealingly mounted within said body,
  anti-friction bearings engaged between the ends of said rotor and interior of said body and restraining said rotor against axial movement,
  an output shaft drivingly connected to said rotor,
  a bearing positioned concentrically within said rotor axially and supporting a reaction pin projecting eccentrically through said rotor,
  a fixed support member retained in the opposite end of said body from said output shaft and fixedly supporting the opposite end of said reaction pin,
  said rotor defining angularly spaced longitudinal slots with arcuately rounded ends defining pressure chambers that rotate within said body with said output shaft,
  elongated pressure elements radially reciprocably and sealingly mounted in said slots,
  bearing members rotatably mounted on said reaction pin and bearing against the inner faces of said pressure elements in eccentric relation to said body and rotor whereby rotation of the rotor will force the pressure elements to reciprocate in said slots and vice versa,
  and means forming a pressure supply duct around a portion of said body,
  said body having an inlet opening formed therethrough from said duct to the surfaces of said rotor and said pressure elements and extending from a position advanced from the point of maximum eccentricity of said pin to a position less than 180° displaced from said point,
  said body further defining an exhaust port angularly advanced from said inlet opening and extending to a point adjacent said point of maximum eccentricity of said pin.

4. An air motor comprising, an elongated cylindrical rotor having a cylindrical bore formed therethrough leaving a wall of substantial radial thickness,
  angularly spaced axially extending slots with arcuate ends formed through said rotor wall and spaced from the ends of the rotor, a cylindrical body rotatably and sealingly engaging the exterior of said rotor around said slots and beyond the ends thereof, an end member fixed in one end of said body and supporting a reaction pin in eccentric position through said rotor, bearings rotatably mounted on said pin within the ends of said rotor and approximately tangent to the interior of the rotor at the point of maximum eccentricity of the pin and bearings, elongated rigid pressure elements radially reciprocably and sealingly slidable in said slots, said pressure elements having a radial thickness approximately equal to the thickness of said rotor wall, and means forming a pressure inlet passage opening through the wall of said body around said body and advanced relative to the maximum eccentric position of said pin, said body defining an exhaust port opening to the periphery of said rotor and said pressure elements in angularly spaced relation to said inlet passage, and a driven shaft concentrically and drivingly connected to one end of said rotor and projecting from the end of said body, said reaction pin being supported at its other end by a bearing concentrically rotatably engaged with the interior of said rotor.

5. An air motor comprising, an elongated cylindrical rotor having a cylindrical bore formed therethrough leaving a wall of substantial radial thickness.

angularly spaced axially extending slots with arcuate ends formed through said rotor wall and spaced from the ends of the rotor, a cylindrical body rotatably and sealingly engaging the exterior of said rotor around said slots and beyond the ends thereof, an end member fixed in one end of said body and supporting a reaction pin in eccentric position through said rotor, bearings rotatably mounted on said pin within the ends of said rotor, elongated rigid pressure elements radially reciprocably and sealingly slidable in said slots and engaged on their radially inner sides with said bearing on said pin, said pressure elements having a radial thickness approximately equal to the thickness of said rotor wall, and means forming a pressure inlet passage opening through the wall of said body around said body and advanced relative to the maximum eccentric position of said pin, said body defining an exhaust port opening to the periphery of said rotor and said pressure elements in angularly spaced relation to said inlet passage, and a driven shaft concentrically and drivingly connected to one end of said rotor and projecting from the end of said body, said reaction pin being supported at its other end by a bearing rotatably engaged with the interior of said rotor.

6. An air motor comprising, an elongated cylindrical rotor having a cylindrical bore formed therethrough leaving a wall of substantial radial thickness, angularly spaced pairs of diametrically opposed axially extending slots with arcuate ends formed through said rotor wall and spaced from the ends of the rotor, a cylindrical body rotatably and sealingly engaging the exterior of said rotor around said slots and beyond the ends thereof, an end member fixed in one end of said body and supporting a reaction pin in eccentric position through said rotor, bearings rotatably mounted on said pin within the ends of said rotor, elongated rigid pressure elements radially reciprocably and sealingly slidable in said slots and engaged on their radially inner sides with said bearings on said pin, said pressure elements having a radial thickness at least equal to the thickness of said rotor wall, and means forming a pressure inlet passage opening through the wall of said body around a sector of the periphery of said body and advanced relative to the eccentric position of said pin, said body defining an exhaust port opening to the periphery of said rotor and said pressure elements in angularly spaced relation to said inlet passage, and a driven shaft concentrically and drivingly connected to one end of said rotor and projecting from the end of said body, said reaction pin being supported at its other end by a bearing rotatably engaged with the interior of said rotor.

7. An air pump and motor having a tubular cylindrical body with a tubular cylindrical rotor rotatably supported in said body concentrically thereof by bearings at the ends of the rotor and the body and characterized by the rotor and body being in closely fitting radially supported relation to each other, said rotor being of substantial radial thickness in its wall, diametrically opposed pairs of angularly spaced and axially extending slots formed in the wall of said rotor and opening radially to the interior of said rotor and terminating short of the ends of said rotor, a shaft connected concentrically to said rotor and extending outwardly of said body.

elongated rigid pressure elements radially reciprocably and substantially sealingly slidably fitted in said slots and having transversely convex outer surfaces curved to substantially the same radius as said rotor at the outer edges of said slots, reaction abutment pin means disposed within the ends of said rotor and supported at one end by a part fixed and supported by said body and at the other end by a bearing concentrically rotatable within one of the ends of said rotor, said pin means having bearing surfaces opposed to the ends of said pressure elements that are eccentric to said rotor and in substantially tangential but relatively movable clearing relation to the interior of said rotor, said presssure elements being approximately equal in radial thickness to the radial depth of said slots at their transverse centers and having transversely flat chordal surfaces opposed to said bearing surfaces on said pin, a first fluid passage formed in said body and opening to the outer ends of said slots, said first passage extending angularly, around said body from a point adjacent the maximum projection of said pressure elements by said eccentric bearing surfaces and extending in angularly advancing direction corresponding to relative rotation of said shaft to a point short of maximum retraction of said pressure elements, and a second fluid passage formed in said body and opening to said slots and starting from a point spaced angularly from the end of said first slot and adjacent the point of maximum retraction of said pressure elements to a point short of the maximum projection of said pressure elements.

8. An air pump and motor having a tubular cylindrical body with a tubular cylindrical rotor rotatably supported in said body concentrically thereof and characterized by the rotor and body being in sealing and radially supported relation to each other along a substantial portion of their lengths between their ends, said rotor being of substantial radial thickness in its wall, angularly spaced and axially extending slots formed in the wall of said rotor and opening radially to the interior of said rotor and terminating short of the ends of said rotor, a shaft drivingly connected to said rotor and concentric with said rotor and extending outwardly of said body, elongated rigid pressure elements radially reciprocably and substantially sealingly slidably fitted in said slots, reaction abutment pin means disposed within the ends of said rotor and supported at one end by a part fixed and supported by said body and at the other end by a bearing concentrically rotatable within one of the ends of said rotor, said pin means having bearing surfaces opposed to the ends of said pressure elements that are eccentric to said rotor and in substantially tangential but relatively movable clearing relation to the interior of said rotor, said pressure elements being approximately equal in radial thickness to the radial depth of said slots at their transverse centers and having surfaces opposed to said bearing surfaces on said pin, a first fluid passage formed in said body and opening to the outer ends of said slots, said first passage extending angularly, around said body from a point adjacent the maximum projection of said pressure elements by said eccentric bearing surfaces and extending in angularly advancing direction corresponding to relative rotation of said shaft to a point short of maximum retraction of said pressure elements, and a second fluid passage formed in said body and opening to said slots and starting from a point spaced angularly from the end of said first slot and adjacent the point of maximum retraction of said pressure elements to a point short of the maximum projection of said pressure elements.

9. An air pump and motor having a tubular cylindrical body with a tubular cylindrical rotor rotatably supported in said body concentrically thereof and characterized by the rotor and body being in sealing and radially supported relation to each other along a substantial portion of their lengths between their ends, said rotor being of substantial radial thickness in its wall, angularly spaced and axially extending slots formed in the wall of said rotor and opening radially to the interior of said rotor and terminating short of the ends of said rotor, a shaft drivingly connected to said rotor and concentric with said rotor and extending outwardly of said body, elongated rigid pressure elements radially reciprocably and substantially sealingly slidably fitted in said slots, reaction abutment pin means disposed within the ends of said rotor and supported at each end by supporting elements which are in turn supported by the ends of said body, said pin means having bearing surfaces opposed to the ends of said pressure elements that are eccentric to said rotor and in substantially tangential but relatively movable clearing relation to the interior of said rotor, said pressure elements being approximately equal in radial thickness to the radial depth of said slots at their transverse centers and having surfaces opposed to said bearing surfaces on said pin, a first fluid passage formed in said body and opening to the outer ends of said slots, said first passage extending angularly, around said body from a point adjacent the maximum projection of said pressure elements by said eccentric bearing surfaces and extending in angularly advancing direction corresponding to relative rotation of said shaft to a point short of maximum retraction of said pressure elements, and a second fluid passage formed in said body and opening to said slots and starting from a point spaced angularly from the end of said first slot and adjacent the point of maximum retraction of said pressure elements to a point short of the maximum projection of said pressure elements, said shaft being connected to said rotor through a planetary gearing including a ring gear secured to said shaft and a sun gear secured to said rotor and planet gears fixedly carried by said body.

10. In an air pump and motor, a tubular body having a central cylindrical inner surface with enlarged inner ends, a tubular cylindrical rotor positioned in said inner surface and having radially reduced ends projecting into the enlarged ends of said body, diametrically opposed pairs of longitudinally extending slots having rounded ends formed through the wall of said rotor, a cylindrical sleeve thinner than said rotor and said body tightly fitted over the center portion of said rotor and closing the outer sides of said slots and in rotating sealing and radially supporting engagement with the central cylindrical surface of said body, an end member fixedly received in one end of said body and supporting a reaction pin projecting eccentrically into said rotor, a first bearing positioned concentrically between the enlarged end of said body and the reduced end of said rotor at the inner side of said end member, an annular carrier ring fixedly secured in the other enlarged end of said body beyond the adjacent end of said sleeve, an anchor disc fixedly supported across the other end of said rotor and in spaced relation to said ring by angularly spaced pins extending between the ring and disc, planet gears rotatable about the axes of said pins and meshing on their radially inner sides with a sun gear drivingly engaged concentrically with the reduced other end of said rotor, a second reaction pin fixedly carried by said anchor disc and concentrically stabilized by a bearing engaged in said other end of said rotor and having an off-set projecting eccentrically into said other end of said rotor in alignment with said first reaction pin, a drive plate concentrically rotatable within said body at the outer side of said anchor disc and having a cylindrical flange spanning said anchor disc with an internal ring gear at its inner end meshing with the radially outer sides of said planet gears, a shaft projecting from said drive plate concentrically of said body and supported by a bearing in said other end of said body, opposed pairs of elongated rigid pressure elements sealingly reciprocably received in said slots and having outer surfaces transversely curved to the contour of the inside of said sleeve, means including an integral cross piece connecting one opposed pair of said pressure elements and cross bars located at the ends of said cross piece connecting the other pair of said pressure elements in spaced relation to the ends of said first pressure elements, bearing surfaces on said reaction pins in clearing substantially tangential relation to the inner surface of said rotor and bearing against the opposed inner ends of said pressure elements, inlet and exhaust ports formed in said sleeve at axially spaced points to each of said slots, a segmental arcuate exhaust passage registerable with said exhaust ports by relative rotation of said rotor and formed through said body from adjacent the point of minimum eccentricity of said bearing surfaces and in the advancing direction of rotation of said rotor to a point adjacent the maximum eccentricity of said bearing surfaces, an inlet passage registerable with said inlet ports by relative rotation of said rotor and formed arcuately through said body from a point advanced from the point of maximum eccentricity to a point spaced behind the point of minimum eccentricity of said bearing surfaces, and a manifold having a pressure supply connection secured to said body over said inlet passage, said inlet passage having an annular deformable seal with an undercut inner corner positioned therein and urged into contact with the rotating surface of said sleeve by a spring bearing between the seal and said manifold.

11. In an air pump and motor, a tubular body having a central cylindrical inner surface, a tubular cylindrical rotor positioned in said inner surface and having ends projecting in the ends of said body, diametrically opposed pairs of longitudinally extending slots having rounded ends formed through the wall of said rotor, a cylindrical sleeve thinner than said rotor and said body tightly fitted over the center portion of said rotor and closing the outer sides of said slots and in rotating engagement with the central cylindrical surface of said body, an end member fixedly received in one end of said body and supporting a reaction pin projecting eccentrically into said rotor, a first bearing positioned concentrically between the end of said body and the end of said rotor at the inner side of said end member, an annular carrier ring fixedly secured in the other end of said body beyond the adjacent end of said sleeve, an anchor disc fixedly supported across the other end of said rotor and in spaced relation to said ring by angularly spaced pins extending between the ring and disc, planet gears rotatable about the axes of said pins and meshing on their radially inner sides with a sun gear drivingly engaged concentrically with the other end of said rotor, a second reaction pin fixedly carried by said anchor disc and projecting eccentrically into said other end of said rotor in alignment with said first reaction pin, a drive plate concentrically rotatable within said body at the outer side of said anchor disc and having a cylindrical flange spanning said anchor disc with an internal ring gear at its inner end meshing with the radially outer sides of planet gears, a shaft projecting from said drive plate concentrically of said body, opposed pairs of elongated rigid pressure elements sealingly reciprocably received in said slots, means including a cross piece connecting one opposed pair of said pressure elements and cross bars located at the ends of said cross piece connected the other pair of said pressure elements in spaced relation to the ends of said first pressure elements, bearing surfaces on said reaction pins in clearing substantially tangential relation to the inner surface of said rotor and bearing against the opposed inner ends of said pressure elements, inlet and exhaust ports formed in said sleeve at axially spaced points to each of said slots, a segmental arcuate exhaust passage registerable with said exhaust ports by relative rotation of said rotor and formed through said body from adjacent the point of minimum eccentricity of said bearing surfaces and in the advancing direction of rotation of said rotor to a point adjacent the maximum eccentricity of said bearing surfaces, an inlet passage registerable with said inlet ports by relative rotation of said rotor and formed arcuately through said body from a point advanced from the point of maximum eccentricity to a point spaced behind the point of minimum eccentricity of said bearing surfaces, and a manifold having a pressure supply connection secured to said body over said inlet passage, said inlet passage having an annular deformable seal positioned therein and in contact with the rotating surface of said sleeve.

12. In an air pump and motor, a tubular body having a central cylindrical inner surface, a tubular cylindrical rotor having ends projecting in the ends of said body, diametrically opposed pairs of longitudinally extending slots having rounded ends formed through the wall of said rotor, a cylindrical sleeve tightly fitted over the center portion of said rotor and closing the outer sides of said slots and in rotating engagement with the central cylindrical surface of said body, an end member fixedly received in one end of said body and supporting a reaction pin projecting eccentrically into said rotor, an annular carrier ring fixedly secured in the other end of said body beyond the adjacent end of said sleeve, an anchor disc fixedly supported across the other end of said rotor and in spaced relation to said ring by angularly spaced pins extending between the ring and disc, planet gears rotatable about the axes of said pins and meshing on their radially inner sides with a sun gear drivingly engaged concentrically with the other end of said rotor, a second reaction pin fixedly carried by said anchor disc and projecting eccentrically into said other end of said rotor in alignment with said first reaction pin, a drive plate concentrically rotatable within said body at the outer side of said anchor disc and having a cylindrical flange spanning said anchor disc with an internal ring gear at its inner end meshing with the radially outer sides of said planet gears, a shaft projecting from said drive plate concentrically of said body, opposed pairs of elongated rigid pressure elements sealingly reciprocably received in said slots, means including a cross piece connecting one opposed pair of said pressure elements and cross bars located at the ends of said cross piece connected the other pair of said pressure elements in spaced relation to the ends of said first pressure elements, bearing surfaces on said reaction pins in clearing relation to the inner surface of said rotor and bearing against the opposed inner ends of said pressure elements, inlet and exhaust ports formed in said sleeve at axially spaced points to each of said slots, a segmental arcuate exhaust passage registerable with said exhaust ports by relative rotation of said rotor and formed through said body from adjacent the point of minimum eccentricity of said bearing surfaces and in the advancing direction of rotation of said rotor to a point adjacent the maximum eccentricity of said bearing surfaces, an inlet passage registerable with said inlet ports by relative rotation of said rotor and formed arcuately through said body from a point advanced from the point of maximum eccentricity to a point spaced behind the point of minimum eccentricity of said bearing surfaces, and a manifold having a pressure supply connection secured to said body over said inlet passage, said inlet passage having an annular deformable seal positioned therein and in contact with the rotating surface of said sleeve.

13. In an air pump and motor,
a tubular body having a central cylindrical inner surface,
a tubular cylindrical rotor having ends projecting in the ends of said body,
diametrically opposed pairs of longitudinally extending slots having rounded ends formed through the wall of said rotor,
a cylindrical sleeve tightly fitted over the center portion of said rotor and closing the outer sides of said slots and in rotating engagement with the central cylindrical surface of said body,
an end member fixedly received in one end of said body and supporting a reaction pin projecting eccentrically into said rotor,
an annular carrier ring fixedly secured in the other end of said body beyond the adjacent end of said sleeve,
an anchor disc fixedly supported across the other end of said rotor and in spaced relation to said ring by angularly spaced pins extending between the ring and disc,
planet gears rotatable about the axes of said pins and meshing on their radially inner sides with a sun gear drivingly engaged concentrically with the other end of said rotor,
a second reaction pin fixedly carried by said anchor disc and projecting eccentrically into said other end of said rotor in alignment with said first reaction pin,
a drive plate concentrically rotatable within said body at the outer side of said anchor disc and having a cylindrical flange spanning said anchor disc with an internal ring gear at its inner end meshing with the radially outer sides of said planet gears,
a shaft projecting from said drive plate concentrically of said body,
opposed pairs of elongated rigid pressure elements sealingly reciprocably received in said slots,
means including a cross piece connecting one opposed pair of said pressure elements and cross bars located at the ends of said cross piece connected the other pair of said pressure elements in spaced relation to the ends of said first pressure elements,
bearing surfaces on said reaction pins in clearing relation to the inner surface of said rotor and bearing against the opposed inner ends of said pressure elements,
inlet and exhaust ports formed in said sleeve at axially spaced points to each of said slots,
a segmental arcuate exhaust passage registerable with said exhaust ports by relative rotation of said rotor and formed through said body from adjacent the point of minimum eccentricity of said bearing surfaces and in the advancing direction of rotation of said rotor to a point adjacent the maximum eccentricity of said bearing surfaces,
and an inlet passage registerable with said inlet ports by relative rotation of said rotor and formed arcuately through said body from a point advanced from the point of maximum eccentricity to a point spaced behind the point of minimum eccentricity of said bearing surfaces.

14. In an air pump, and motor,
a tubular body,
a tubular cylindrical rotor positioned in said body and having ends projecting into the ends of said body,
diametrically opposed pairs of longitudinally extending slots having rounded ends formed through the wall of said rotor,
a cylindrical sleeve tightly fitted over the center portion of said rotor and closing the outer sides of said slots,
an end member fixedly received in one end of said body and supporting a reaction pin projecting eccentrically into said rotor,
a first bearing positioned concentrically between the end of said body and the end of said rotor at the inner side of said end member,
an annular carrier ring fixedly secured in the other end of said body beyond the adjacent end of said sleeve,
an anchor disc fixedly supported across the other end of said rotor and in spaced relation to said ring by angularly spaced pins extending between the ring and disc,
planet gears rotatable about the axes of said pins and meshing on their radially inner sides with a sun gear drivingly engaged concentrically with the other end of said rotor,
a second reaction pin fixedly carried by said anchor disc and concentrically stabilized by a bearing engaged in said other end of said rotor and having an off-set projecting eccentrically into said other end of said rotor in alignment with said first reaction pin,
a drive plate concentrically rotatable within said body at the outer side of said anchor disc and having a cylindrical flange spanning said anchor disc with an internal ring gear at its inner end meshing with the radially outer sides of said planet gears,
a shaft projecting from said drive plate concentrically of said body and supported by a bearing in said other end of said body,
opposed pairs of elongated rigid pressure elements sealingly reciprocably received in said slots and having outer surfaces transversely curved to the contour of the inside of said sleeve,
means including an integral cross piece connecting one opposed pair of said pressure elements and cross bars located at the ends of said cross piece connecting the other pair of said pressure elements in spaced relation to the ends of said first pressure elements,
bearing surfaces on said reaction pins in clearing substantially tangential relation to the inner surface of said rotor and bearing against the opposed inner ends of said pressure elements,
inlet and exhaust ports formed in said sleeve at axially spaced points to each of said slots,
a segmental arcuate exhaust passage registerable with said exhaust ports by relative rotation of said rotor and formed through said body from adjacent the point of minimum eccentricity of said bearing surfaces and in the advancing direction of rotation of said rotor to a point adjacent the maximum eccentricity of said bearing surfaces,
an inlet passage registerable with said inlet ports by relative rotation of said rotor and formed arcuately through said body from a point advanced from the point of maximum eccentricity to a point spaced behind the point of minimum eccentricity of said bearing surfaces,
and a manifold secured to said body over one of said passages,
said last passage having an annular deformable seal with an undercut inner corner positioned therein and urged into contact with the rotating surface of said sleeve by a spring bearing between the seal and said manifold.

15. In an air pump and motor,
a tubular body,
a tubular cylindrical rotor positioned in said body and having ends projecting into the ends of said body,
diametrically opposed pairs of longitudinally extending slots formed through the wall of said rotor,
a cylindrical sleeve tightly fitted over the center portion of said rotor and closing the outer sides of said slots,
an end member fixedly received in one end of said body and supporting a reaction pin projecting eccentrically into said rotor, a first bearing positioned concentrically between the end of said body and the end of said rotor at the inner side of said end member, an annular carrier ring fixedly secured in the other end of said body beyond the adjacent end of said sleeve, an anchor disc fixedly supported across the other end of said rotor and in spaced relation to said ring by angularly spaced pins extending between the ring and disc, planet gears rotatable about the axes of said pins and meshing on their radially inner sides with a sun gear drivingly engaged concentrically with the other end of said rotor, a second reaction pin fixedly carried by said anchor disc and concentrically stabilized by a bearing engaged in said other end of said rotor and having an off-set projecting eccentrically into said other end of said rotor in alignment with said first reaction pin, a drive plate concentrically rotatable within said body at the outer side of said anchor disc and having a cylindrical flange spanning said anchor disc with an internal ring gear at its inner end meshing with the radially outer sides of said planet gears, a shaft projecting from said drive plate concentrically of said body and supported by a bearing in said other end of said body, opposed pairs of elongated rigid pressure elements sealingly reciprocably received in said slots, means connecting the pressure elements of opposed pairs of said pressure elements in spaced relation with the connecting means located in spaced relation to the ends of said pressure elements, bearing surfaces on said reaction pins in clearing relation to the inner surface of said rotor and bearing against the opposed inner ends of said pressure elements, inlet and exhaust ports formed in said sleeve at axially spaced points to each of said slots, a segmental arcuate exhaust passage registerable with said exhaust ports by relative rotation of said rotor and formed through said body from adjacent the point of minimum eccentricity of said bearing surfaces and in the advancing direction of rotation of said rotor to a point adjacent the maximum eccentricity of said bearing surfaces, an inlet passage registerable with said inlet ports by relative rotation of said rotor and formed arcuately through said body from a point advanced from the point of maximum eccentricity to a point spaced behind the point of minimum eccentricity of said bearing surfaces, and a manifold secured to said body over one of said passages, said last passage having an annular deformable seal positioned therein in contact with the rotating surface of said sleeve.

16. An air pump and motor comprising, a tubular body having a central cylindrical inner surface with axially and angularly spaced segmental inlet and outlet passages formed therethrough, a cylindrical tubular rotor rotatably supported in said body and having diametrically opposed slots formed through its wall, a sleeve closely fitting around said rotor and rotatable therewith in radially supported relation to said central cylindrical inner surface and covering the outsides of said slots with inlet and outlet ports formed in said sleeve to register between each slot and said inlet and outlet passages, a drive shaft rotatably supported concentrically in one end of said body and drivingly connected through a planetary gearing to said rotor, reaction pin means fixedly supported at the opposite end of said body from said shaft and at the shaft end of the body from a fixed support for part of said planetary gearing and extending into said rotor, bearing surfaces on said pin means in substantially tangential clearing relation to the inside of the rotor and eccentric to said rotor and body, and elongated rigid pressure elements reciprocably and substantially sealingly mounted in said slots in said rotor and having the inner side of their ends in thrust transmitting relation to said eccentric bearing surfaces, opposed pairs of said pressure elements being rigidly connected together.

17. An air pump and motor comprising, a tubular body having a central cylindrical inner surface with axially and angularly spaced segmental inlet and outlet passages formed therethrough, a cylindrical tubular rotor rotatably supported in said body and having diametrically opposed slots formed through its wall, a sleeve closely fitting around said rotor and rotatable therewith in radially supported relation to said central cylindrical inner surface and covering the outsides of said slots with inlet and outlet ports formed in said sleeve to register between each slot and said inlet and outlet passages, a drive shaft rotatably supported concentrically in one end of said body and drivingly connected to said rotor, reaction pin means fixedly supported at the opposite end of said body from said shaft and at the shaft end of the body and extending into said rotor, bearing surfaces on said pin means in substantially tangential clearing relation to the inside of the rotor and eccentric to said rotor and body, an elongated rigid pressure elements reciprocably and substantially sealingly mounted in said slots in said rotor and having the inner side of their ends in thrust transmitting relation to said eccentric bearing surfaces.

18. An air pump and motor comprising, a tubular body having axially and angularly spaced segmental inlet and outlet passages formed therethrough, a cylindrical tubular rotor rotatably supported in said body by bearings at the ends of the rotor and having diametrically opposed slots formed through its wall, a sleeve closely fitting around said rotor and rotatable therewith and covering the outsides of said slots with inlet and outlet ports formed in said sleeve to register between each slot and said inlet and outlet passages, an annular seal in one of said passages sealing against the surface of said sleeve, a drive shaft rotatably supported concentrically in one end of said body and drivingly connected through a planetary gearing to said rotor, reaction pin means fixedly supported at the opposite end of said body from said shaft and at the shaft end of the body from a fixed support for part of said planetary gearing and extending into said rotor, bearing surfaces on said pin means in clearing relation to the inside of the rotor and eccentric to said rotor and body, and elongated rigid pressure elements reciprocably and substantially sealingly mounted in said slots in said rotor and having the inner side of their ends in thrust transmitting relation to said eccentric bearing surfaces, opposed pairs of said pressure elements being rigidly connected together.

19. An air pump and motor comprising, a tubular body having a central cylindrical inner surface with axially and angularly spaced segmental inlet and outlet passages formed therethrough, a cylindrical tubular rotor rotatably supported in said body and having diametrically opposed slots formed through its wall, a sleeve closely fitting around said rotor and rotatable therewith in radially supported relation to said central cylindrical inner surface and covering the outsides of said slots with inlet and outlet ports formed in said sleeve to register between each slot and said inlet and outlet passages, a drive shaft rotatably supported concentrically in one end of said body and drivingly connected to said rotor, reaction pin means fixedly supported at the opposite end of said body from said shaft and at the shaft end of the body and extending into said rotor, bearing surfaces on said pin means in clearing relation to the inside of the rotor and eccentric to said rotor and body, and elongated rigid pressure elements reciprocably and substantially sealingly mounted in said slots in said rotor and having the inner side of their ends in thrust transmitting relation to said eccentric bearing surfaces.

20. An air pump and motor comprising, a tubular body having a central cylindrical inner surface with angularly spaced segmental inlet and outlet passages formed therethrough, a cylindrical tubular rotor rotatably supported in said body and having angularly spaced axial slots formed through its wall, a sleeve closely fitting around said rotor and rotatable therewith in radially supported relation to said central cylindrical inner surface and covering the outsides of said slots with ports formed in said sleeve to register successively between each slot and said inlet and outlet passages, a drive shaft rotatably supported concentrically in one end of said body and drivingly connected to said rotor, reaction pin means fixedly supported at the opposite end of said body from said shaft and at the shaft end of the body and extending into said rotor, bearing surfaces on said pin means in clearing relation to the inside of the rotor and eccentric to said rotor and body, and elongated rigid pressure elements reciprocably and substantially sealingly mounted in said slots in said rotor and having the inner side of their ends in thrust transmitting relation to said eccentric bearing surfaces.

References Cited in the file of this patent

UNITED STATES PATENTS

| | | |
|---|---|---|
| 911,590 | Henrikson | Feb. 9, 1909 |
| 2,217,669 | Cantoni | Oct. 15, 1940 |
| 2,284,763 | Olson | June 2, 1942 |
| 2,337,427 | Thompson | Dec. 21, 1943 |
| 3,002,504 | Taylor | Oct. 3, 1961 |